(No Model.) 2 Sheets—Sheet 2.
J. F. SMITH.
CULTIVATOR.
No. 354,260. Patented Dec. 14, 1886.
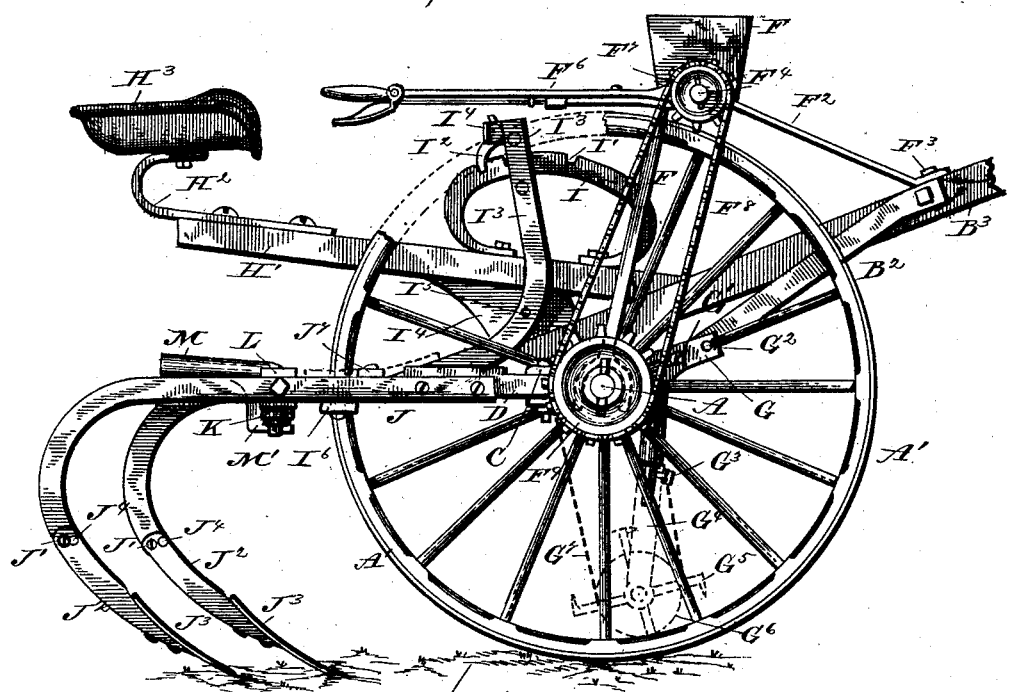
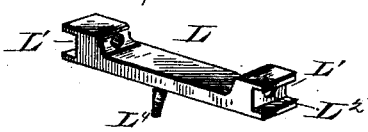
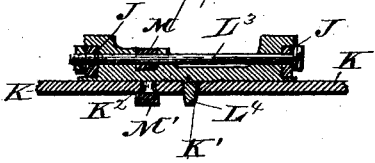
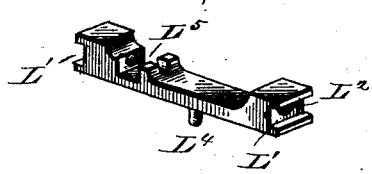
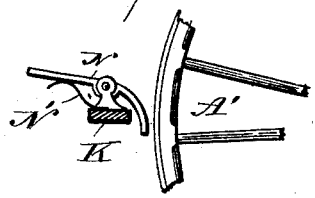
Witnesses:
S. C. Mills,
Wm S. Duvall.
Inventor:
J. F. Smith
By his Attorney,
E. K. Stocking

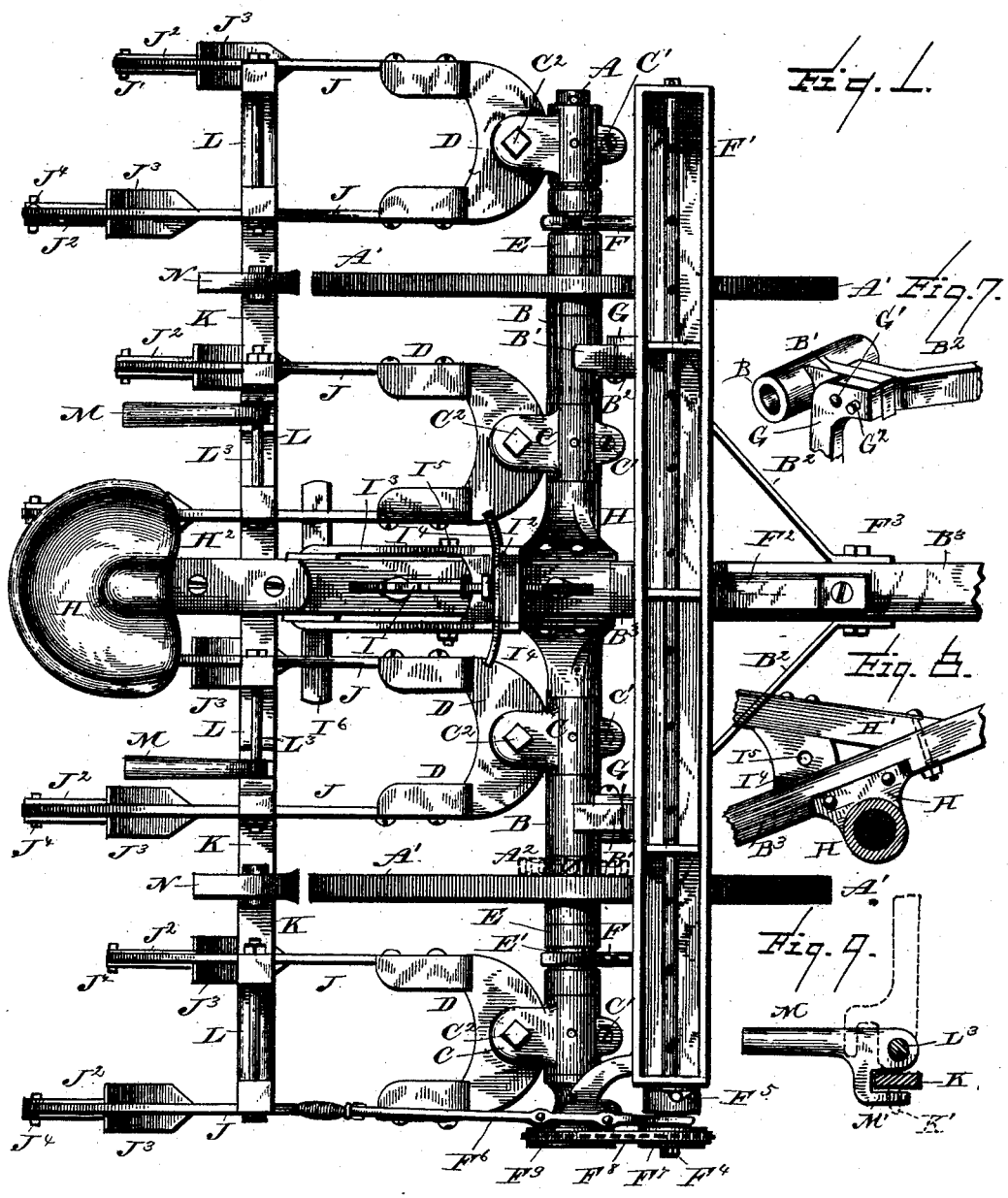

UNITED STATES PATENT OFFICE.

JAMES F. SMITH, OF DANVILLE, ILLINOIS.

CULTIVATOR.

SPECIFICATION forming part of Letters Patent No. 354,260, dated December 14, 1886.

Application filed June 12, 1886. Serial No. 204,994. (No model.)

*To all whom it may concern:*

Be it known that I, JAMES F. SMITH, a citizen of the United States, residing at Danville, in the county of Vermilion, State of Illinois, have invented certain new and useful Improvements in Cultivators, of which the following is a specification, reference being had therein to the accompanying drawings.

This invention has relation to certain improvements upon my invention for which United States Patent No. 335,644, dated February 9, 1886, was granted; and the objects of the improvements are, among other things, to enable the operator of the cultivator to force the same to its work, in order that it shall be capable of use in the place of breaking-up plows—that is, to work satisfactorily and at desired depths in hard soil—and also to dispose of the shovels in such a manner that they will take into the soil at each side of a row of corn, whereby the machine may be used to cultivate planted ground, and, further, to adapt the machine for use as a seeder and stalk-cutter, all as hereinafter more fully described.

The novel features of the invention, together with the advantages secured thereby, will be specifically described, and particularly pointed out in the claims.

Referring to the drawings, Figure 1 is a plan, and Fig. 2 a side elevation, of my cultivator with my improvements embodied therein. Figs. 3 to 9 are details hereinafter described.

Like letters indicate like parts in all the figures of the drawings.

A represents the axle, upon which are mounted the wheels A', one of which has in its hub a set-screw, A², whereby said wheel may be connected rigidly with the axle, so as to cause the latter to revolve when desired. Upon the axle, between the wheels, are mounted a series of castings, each bored longitudinally for the passage of the axle, and each otherwise formed for the attachment or connection of certain parts of the cultivator. Of such castings those indicated by B (see Fig. 7) are provided with projecting rigid arms B', to which the braces B² of the pole B³ of the cultivator are attached, preferably upon the inside of the arms B'. Those castings indicated by the letter C are divided on longitudinal lines and secured upon the axle by bolts C' C², the latter serving for the pivotal connection of the cultivator-beam-connecting casting D. Similar beam-connecting castings and couplers, C, are arranged upon the axle outside of the wheels.

One feature of my improvements consists of a casting, E, bored for the reception of and mounted upon the axle, and arranged outside of and next to the wheel. This casting is circumferentially grooved, as at E', to form a seat for a bifurcated standard, F, which supports a seed-dropping mechanism comprising a hopper, F', from which there depends at the front a third brace or standard, F², which is secured by a bolt, F³, to the upper surface of the pole B³. The shaft F⁴ of the seed-dropping mechanism projects from one end of the box F', and is provided with a clutch, F⁵, operated by a lever, F⁶, these elements being of any well-known construction, as may also be the seed-dropping mechanism. A sprocket-wheel, F⁷, is rigidly secured to the shaft F⁴, and a chain, F⁸, extends therefrom to the sprocket F⁹, arranged on the axle A, whereby when the set-screw A² in the hub of the wheel A' is set firmly against the axle A said axle receives motion from the wheel, and said motion is conveyed by the chain F⁸ and the sprocket F⁷ to the seed-dropping mechanism. The latter is, it will be readily seen, in its nature an attachment to my machine, and is capable of being thrown into and out of operation by the clutch and lever described and by the set-screw in the hub of the wheel, so that by the construction and devices mentioned the cultivator is transformed into a seeding-machine, by which, after the seeds are dropped, they may be covered by the following shovels of the cultivator, unless the same should be elevated from contact with the ground by devices hereinafter described.

Upon the outside of the arms B' of the castings B, I secure a pivoted hanger, G, (see Figs. 2 and 7,) by means of a bolt, G', the hanger being extended to the front and provided with a break-pin, G², which is an ordinary wooden peg passed through an aperture in the forward extension of the arm and into a similar aperture formed in the arm B'. The lower end of the arm G is adapted, by means of a bolt or screw, G³, to receive and retain the hanger G⁴ of any ordinary stalk-cutting mechanism, G⁵, having its shaft mounted in bearings in the lower end of the arms G⁴, (there being one at each side of the machine,) and provided with any usual sprocket-wheel, G⁶, which, by means of a chain, G⁷, is connected with a similar wheel mounted on the axle A. (See dotted lines, Figs. 1 and 2.)

By reason of the break-pin G², should the stalk-cutting mechanism come in contact with a rock, stump, or other hard substance, the said pin would break, and thus allow the stalk-cutting mechanism to swing to the rear on its pivot G and pass over the obstruction without injury to its mechanism.

It will be seen that one of the wheels A' is rigidly secured to the axle A by means of a set-screw, A², and that motion will be conveyed to the rotary cutters G⁵ through the sprocket-wheels and chain, and that by means of this mechanism standing stubble or stalks may be cut as the cultivator is drawn over the ground.

Of those castings which are mounted upon the axle, the central one (indicated by the letter H, see Figs. 1 and 8) serves as the means of connection for the pole B³. Upon the pole is mounted a beam, H', upon which the seat-spring and seat H² H³ are mounted. Upon the same beam there is secured a notched segment, I, (see Figs. 1 and 2,) the notches I' of which are intended to receive the pawl I², pivotally supported in the plow-lifting lever I³, which is provided with a cross-bar, I⁴, against which the foot or feet of the operator is or are placed when the plows are to be elevated, in a manner hereinafter described.

In this instance a bolt, I⁵, is passed through the lever I, which is bifurcated, to embrace the beam H' and the bracket H⁴, arranged between it and the pole B³. Said bolt serves as the pivot of the lever, and the latter is extended rearwardly and provided with a cross-bar, I⁶, which passes beneath the beams J of the two adjacent sections or series of the shovels employed in the cultivator. These beams J are each downwardly and forwardly curved, and are supported by means of pivots J', the shovel-arms J² carrying shovels J³. Break-pins J⁴ are pivoted in each of the shovel-arms for the usual well-known purpose—namely, to prevent breakage of the machine. Another cross-bar, I⁷, is secured to the end of the lifting-lever and arranged to lie above and across the two shovel-beams J and opposite the cross-bar I⁶.

K is a bar extending along under the entire series of shovel-beams, and is connected to said beams in the following manner and by the following means:

L represents a casting having at each end thereof a recess, L', for the reception of a shovel-beam, J. The inner walls of these recesses are perforated, as at L², for the passage of a bolt, L³, whereby the beams J are held parallel with each other, and by means of a lug, L⁴, depending from the bottom of the casting L and passing through the bar K, said castings L are secured to said bar in a manner which will permit of a lateral movement of each pair of shovel-beams about the lug L⁴ and the pivot C² of each of the beam-castings D. In the castings L, (shown in Fig. 1 as connecting the inner two pairs of shovel-beams with each other and with the bar K,) I have provided at their upper surfaces a recess, L⁵, (see Figs. 3, 4, 5, and 8,) for the reception of a locking and lifting lever, M, which is pivoted upon the rod L³ and extended downwardly in rear of and forwardly under the bar K, as at M'. (See Fig. 2.)

Under each of the castings L there are formed in the bar K a series of holes, K', into either of which the lug L⁴ of the casting L may be inserted whenever the lever M is raised upon its pivot to disengage its lug M' from the bar K, and to raise the casting above the bar so as to permit of the introduction of its lug into any one of the holes K' therein. In this manner the two inner pairs of shovels may be spread apart, so as to cultivate standing corn, and, if desired, levers M may be provided in all of the castings L employed in the machine, whereby all of the shovels of the machine may be adjusted and lifted from the ground, as desired.

At N, I mount upon the bar K scrapers, which, by means of springs N', are normally held out of contact with the wheels A', but which, being accessible to the operator when in the seat H³, may be by means of the foot thrown into contact with the wheel to remove the dirt from the same when desired. It is also apparent that when in the seat H³ a foot of the operator may be pressed against the cross-bar I⁴ of the lifting-lever I³, while the heel of the operator may raise the pawl I² out of connection with the notches I' of the segment I, and the said lever may be forced to the front, whereby the entire series of shovels may be elevated out of the ground by means of the cross-bar I⁶. On the other hand, by means of the cross-bar I⁷, the said shovels may be forcibly retained at a desired depth in the ground, and held there by means of the pawl I², the cross-bar I⁷ being arranged so as to rest above and upon the beams J, as hereinbefore described.

Having described my invention and its operation, what I claim is—

1. In a cultivator of the class described, the combination of the axle-frame provided with the sprocket-wheel F⁹, the casting H, the pole B³, the castings B, and the grooved castings E, adapted and arranged to support and operate the seed-dropping mechanism, substantially as shown and described.

2. The combination of the axle A, the wheels A', the castings B, having the arms B', the casting H, the pole B³, secured thereto, the braces B², the divided casting C, the pivotally-connected castings D, the shovel-beams J, the castings L, the bolts L³, and the bar K, substantially as specified.

3. The combination of the axle A, wheels A', castings C, pivoted castings D, beams J, bar K, and the lifting-lever I³, having the bar I⁶, and the pawl and sector, substantially as specified.

4. In a cultivator of the class described, an axle having loosely mounted castings thereon for coupling therewith the shovel-beams and pole and the braces of the pole, and provided with a sprocket, in combination with the castings B B', a depending arm, as G, pivoted to the brace-arms, as at G', provided with a breaking-pin on the forward extension of said arm, as at G², and adapted, substantially as described, for the connection of stalk-cutting mechanism, substantially as and for the purpose set forth.

5. The combination of the axle A, provided with the sprocket F⁹, the casting B, provided with the arm B' and the arm G, and adapted to operate the chain G⁷, and a stalk-cutting mechanism, substantially as specified.

6. In a cultivator of the class described, the casting L, having recesses L' at each end, and a lug, L⁴, in combination with the shovel-beams, and with the shovel-beam-connecting bar K, substantially as specified.

7. The combination, with the shovel-beam-connecting bar K, of the herein-described casting connecting the shovel-beams, and means for removably connecting said casting to the bar, substantially as specified.

8. The combination, with the bar K and shovel-beams J, of the casting L, provided with the recesses L' L⁵, the perforations L², and the lug L⁴, of the perforated bar K and the locking-lever N, substantially as specified.

In testimony whereof I affix my signature in presence of two witnesses.

JAMES F. SMITH.

Witnesses:
S. JAMES McKEE,
A. W. HEINLY.